United States Patent [19]

Ishii

[11] Patent Number: 5,103,780
[45] Date of Patent: Apr. 14, 1992

[54] VALVE TIMING CONTROL SYSTEM FOR INTERNAL COMBUSTION ENGINE

[75] Inventor: Akira Ishii, Kanagawa, Japan

[73] Assignee: Nissan Motor Company, Limited, Yokohama, Japan

[21] Appl. No.: 521,698

[22] Filed: May 10, 1990

[30] Foreign Application Priority Data

May 11, 1989 [JP] Japan .................................. 1-118297

[51] Int. Cl.$^5$ ................................................ F01L 1/34
[52] U.S. Cl. ............................ 123/90.15; 123/90.17
[58] Field of Search ............... 123/90.15, 90.16, 90.17; 180/170

[56] References Cited

U.S. PATENT DOCUMENTS

| | | | |
|---|---|---|---|
| 4,844,022 | 7/1989 | Konno | 123/90.17 |
| 4,856,465 | 8/1989 | Denz et al. | 123/90.17 |
| 4,917,057 | 4/1990 | Seki | 123/90.16 |
| 4,938,188 | 7/1990 | Seki et al. | 123/90.16 |
| 4,960,083 | 10/1990 | Seki et al. | 123/90.16 |
| 4,960,094 | 10/1990 | Koike et al. | 123/90.16 |
| 4,960,095 | 10/1990 | Koike et al. | 123/90.16 |

FOREIGN PATENT DOCUMENTS 62-191636  8/1987  Japan .

*Primary Examiner*—E. Rollins-Cross
*Assistant Examiner*—Weilun Lo
*Attorney, Agent, or Firm*—Foley & Lardner

[57] ABSTRACT

In a valve timing control system for an internal combustion engine, a magnitude of a valve overlap is set small when a car speed is less than a predetermined value, irrespective of a monitored engine driving condition. On the other hand, the magnitude of the valve overlap is set large depending on the monitored engine driving condition when the car speed is no less than the predetermined value.

14 Claims, 2 Drawing Sheets

VALVE TIMING CONTROL SYSTEM FOR INTERNAL COMBUSTION ENGINE

BACKGROUND OF THE INVENTION

1. Field of the Invention

The present invention relates generally to a valve timing control system for an internal combustion engine, and more specifically, to such a valve timing control system that can adjust a phase relationship of opening and closing timings between an intake valve and an exhaust valve so as to control a magnitude of valve overlap where both the intake valve and the exhaust valve are opened, according to an engine driving condition.

2. Description of the Background Art

A valve timing control system for an internal combustion engine is known, such as disclosed in Japanese Patent First Publication No. 62-191636, wherein a phase relationship of valve timings (opening and closing timings) between an intake valve and an exhaust valve is variable so as to control a magnitude of valve overlap (both the intake and exhaust valves being opened) to be optimum depending on a monitored engine operating condition.

In this publication, the valve timing control system includes a valve timing varying mechanism. The valve timing varying mechanism includes a timing pulley which is driven by an engine crankshaft in synchronism therewith through a timing belt, a camshaft for actuating an intake valve, and a valve timing adjusting element provided between the timing pulley and the camshaft. Gear means is further provided between the timing pulley and the valve timing adjusting element and between the valve timing adjustment element and the camshaft such that an axial movement of the valve timing adjusting element causes a rotational displacement of the camshaft relative to the timing pulley, i.e. the engine crankshaft to change an angular phase relationship therebetween. Accordingly, when the valve timing adjusting element moves axially to rotate the camshaft relative to the engine crankshaft, the valve timing of the intake valve is varied relative to that of the exhaust valve so that variation of a magnitude of the valve overlap is caused.

The valve timing control system further includes a hydraulic circuit which selectively supplies a preset hydraulic pressure to the valve timing varying mechanism. The hydraulic circuit includes a pressure control valve in the form of a solenoid valve which is energized to close so as to establish the hydraulic pressure within the hydraulic circuit to move the valve timing adjusting element axially in one direction against a force of a coil spring to rotate the camshaft in one direction so as to advance the valve timing of the intake valve to enlarge the valve overlap, the solenoid valve is selectively deenergized to open so as to release the hydraulic pressure therethrough to allow the valve timing adjusting element to move in an axially opposite direction to an initial position by means of the spring force so as to rotate the camshaft in an opposite rotational direction. In the initial position of the valve timing adjust element, the phase relationship of the valve timings between the intake valve and the exhaust valve is initialized where the valve overlap is set minimum.

The valve timing control system further includes a control unit which controls the energization of the pressure control valve according to the engine driving condition. Specifically, when the engine is operated at a low or intermediate speed under an engine high load, the control unit energized the pressure control valve to enlarge the valve overlap. As is well known in the art, under these conditions, it is desirable to enhance an intake efficiency or a volumetric efficiency of air/fuel mixture into an engine combustion chamber using the intake inertia as much as possible to improve the engine torque. Accordingly, the valve overlap is set larger as noted above. On the other hand, when the engine is operated at the low or intermediate speed under an engine low load, the control unit deenergizes the pressure control valve so as to make the valve overlap smaller. Specifically, when the valve overlap is large under these engine driving conditions, a large amount of the exhaust gas runs back into the engine combustion chamber drawn by a large intake vacuum within the engine combustion chamber. Generally, since less fuel is supplied under the engine low load, the air/fuel mixture to be combusted in the combustion chamber includes an insufficient amount of fuel while a large amount of the residual combustioned gas is present, resulting in poor combustion and leading to an insufficient engine torque which becomes serious, particularly when the engine speed is low. Accordingly, the valve overlap is set smaller as noted above. Further, when the engine is operated at speed which is higher than a certain high speed, the control unit deenergizes the pressure control valve to set the valve overlap smaller since the large valve overlap reduces the maximum engine torque under such a high engine speed even when the engine load is high.

In the background art as noted above, however, since the magnitude of the valve overlap is controlled solely by the engine speed and the engine load, the following defects have arisen:

For example, in an automatic drive car, when an accelerator pedal is immediately released after a so-called stall starting where the accelarator pedal is applied to increase the engine speed with a brake pedal being also applied so as to start the car with the increased engine speed, an engine stall or stop, or an extreme engine speed reduction is caused. Specifically, since the engine speed and the engine load are increased in the stall starting, the control unit energizes the pressure control valve to enlarge the valve overlap as noted above. When the accelarator pedal is suddenly released under this condition, the control unit stops the energization to the pressure control valve for setting the valve overlap smaller. Since there exists a considerable delay or lag until the valve timing adjusting element actually returns to its initial position due to the displacement of the valve timing adjusting element being controlled by the hydraulic pressure, the valve overlap cannot be made smaller immediately after the accelerator pedal is released. Accordingly, even when the engine speed is lowered to near an engine idling speed, the magnitude of the valve overlap does not return to its predetermined initial minimum value due to the response delay of the valve timing adjusting element so that the air/fuel mixture becomes too lean to produce an engine torque large enough to maintain the engine operation by itself.

SUMMARY OF THE INVENTION

Therefore, it is an object of the present invention to provide a valve timing control system for an internal combustion engine that can eliminate the above-noted defects inherent in the background art.

It is another object of the present invention to provide a valve timing control system for an internal combustion engine that can prevent a failure of the engine operation even when a monitored engine load suddenly varies from high to low when a car speed is low.

To accomplish the above-noted and other objects, in a valve timing control system for an internal combustion engine according to the present invention, a magnitude of a valve overlap is set small when a car speed is less than a predetermined value, irrespective of a monitored engine driving condition. On the other hand, the magnitude of the valve overlap is set large depending on the monitored engine driving condition when the car speed is no less than the predetermined value.

According to one aspect of the present invention, a valve timing control system for an internal combustion engine, wherein a magnitude of a valve overlap is controlled depending on a monitored engine driving condition, comprises:

a valve timing varying mechanism which is adapted to vary the magnitude of the valve overlap between a first value where the magnitude of the valve overlap is small and a second value where the magnitude of the valve overlap is large;

first means for selectively applying first and second actuation forces to the valve timing varying mechanism to cause the latter to vary the magnitude of the valve overlap between the first and second values;

second means for deriving a car speed based on an output from car speed sensor means;

third means for comparing the derived car speed with a predetermined value;

fourth means, responsive to the third means, for controlling the first means to apply the first actuation force to the valve timing varying mechanism, irrespective of the monitored engine driving condition, to set the magnitude of the valve overlap to the first value when the derived car speed is less than the predetermined value;

fifth means, responsive to the third means, for controlling the first means to apply the second actuation force to the valve timing varying mechanism, depending on the monitored engine driving condition, to set the magnitude of the valve overlap to the second value when the derived car speed is no less than the predetermined value.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Now, a valve timing control system for an internal combustion engine according to a preferred embodiment of the present invention will be described hereinbelow with reference to FIGS. 1 and 2.

Figure 1:
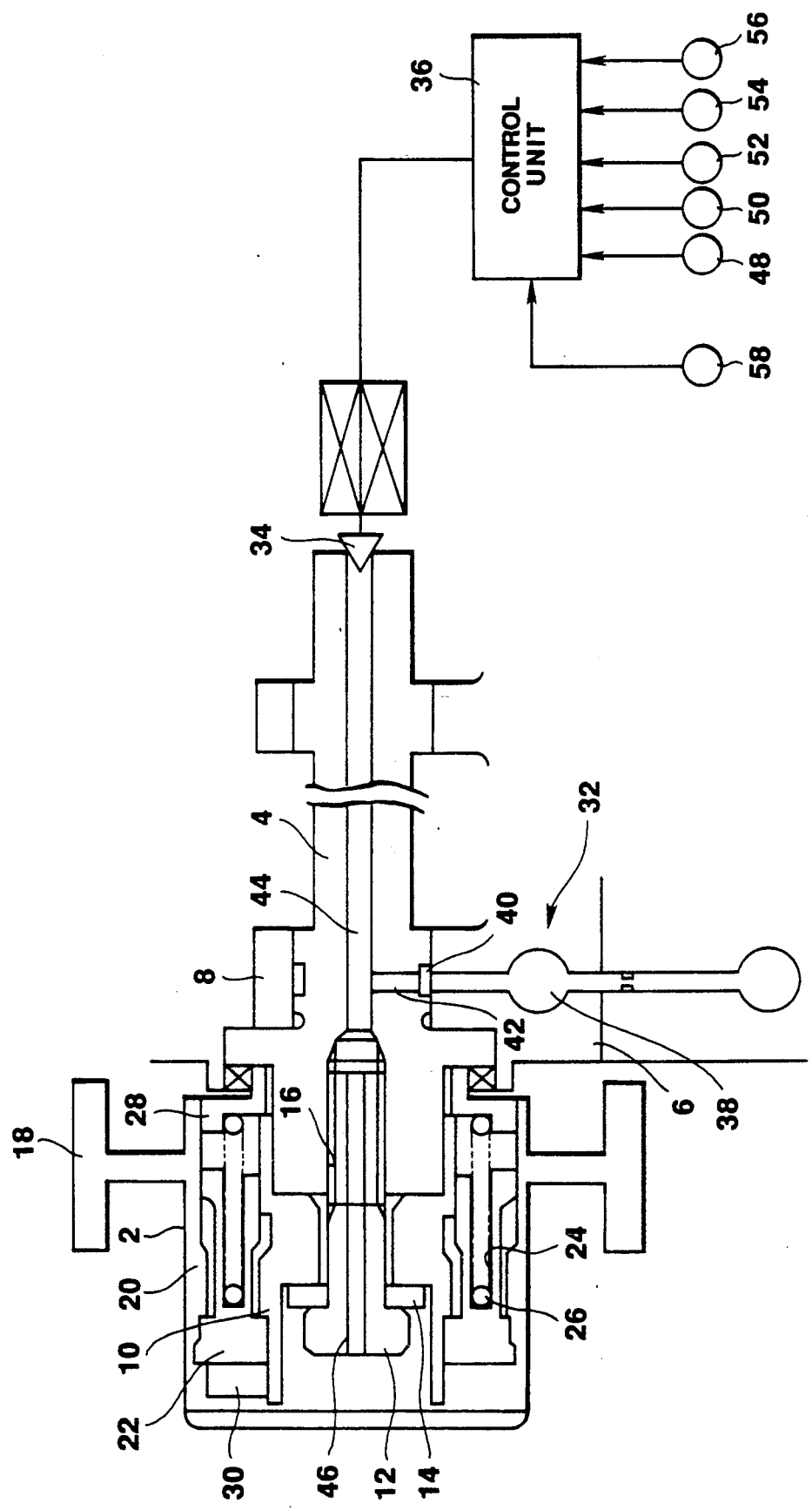
FIG. 1 is a schematic diagram showing an overall structure of a valve timing control system for an internal combustion engine according to a preferred embodiment of the present invention.

FIG. 1 shows an overall structure of the valve timing control system which includes a valve timing varying mechanism 2. The valve timing varying mechanism 2 includes a camshaft 4 which is rotatably supported on a cylinder head 6 by means of a bearing member 8. A rotational movement of the camshaft 4 actuates an intake valve to open and close through a cam fixed onto the camshaft 4. Accordingly, a rotational angular position of the camshaft 4 determines a position of the intake valve between its fully opened and fully closed positions.

An inner cylinder 10 is firmly fixed to a front end of the camshaft 4 by means of a bolt 12 and a plain washer 14. The bolt 12 is secrewed into a corresponding threaded bore 16 formed in a front end section of the camshaft 4 with the washer 14 pressing the inner cylinder 10 toward the front end of the camshaft 4 so as to firmly secure the inner cylinder 10 to the camshaft 4 for co-rotation with the latter.

A timing pulley or a timing sprocket 18 is integrally formed with an outer cylinder 20 and is driven by an engine crankshaft (not shown) through a timing belt or a timing chain so as to rotate in synchronism with the engine crankshaft. Accordingly, the timing pulley 18, together with the outer cylinder 20 is representative of an engine operating cycle position. The outer cylinder 20 is arranged coaxially with the inner cylinder 10 with a predetermined radial gap therebetween.

A ring gear member 22 is disposed in the radial gap between the inner and outer cylinders 10 and 20 coaxially therewith. The ring gear member 22 is formed on its outer periphery with outer gear teeth which are meshed with inner gear teeth formed on an inner periphery of the outer cylinder 20. The ring gear member 22 is further formed on its inner periphery with inner gear teeth which are meshed with outer gear teeth formed on an outer periphery of the inner cylinder 10. At least one of the two meshed connections between the inner cylinder 10 and the ring gear member 22 and between the ring gear member 22 and the outer cylinder 20 is formed by helical gears so as to convert an axial movement of the ring gear member 22 into a rotational displacement of the inner cylinder 10, that is, a rotational displacement of the camshaft 4 relative to the outer cylinder 20, i.e. to the engine crankshaft. Specifically, the axial movement of the ring gear member 22 causes the camshaft 4, through the inner cylinder 10 to perform a corresponding angular displacement relative to the engine crankshaft so as to vary the valve timing of the intake valve relative to that of the exhaust valve. The aforementioned meshed connections are per se well known in the art.

The ring gear member 22 is formed with an annular bore 24 which open backward and receives a coil spring 26 therein. The coil spring 26 is axially disposed between the ring gear member 22 and a valve seat member 28 fixed to a rear end of the outer cylinder 20 for biasing the ring gear member 22 forward, that is, toward a pressure chamber 30 which constitutes a portion of a hydraulic circuit 32.

The hydraulic circuit 32 selectively supplies a preset hydraulic pressure to the valve timing varying mechanism 2 so as to adjust a magnitude of the valve overlap according to a monitored engine driving condition. Specifically, the hydraulic circuit 32 includes a pressure control valve 34 in the form of a solenoid valve, opening and closing operations of which are controlled by a control unit 36, which will be described in detail later. When the pressure control valve 34 is closed, a pressurized working fluid is supplied into the pressure chamber 30 from an oil pan (not shown) through an engine oil pump (not shown), a main oil gallery 38 formed in the cylinder head 6, an annular groove 40 formed on an outer periphery of the camshaft 4, a radial oil passage 42 formed in the camshaft 4, an axial oil passage 44 formed in the camshaft 4, and an axial oil passage 46 formed through the bolt 12 to generate the preset hydraulic pressure within the pressure chamber 30. The hydraulic pressure within the pressure chamber 30 urges the ring gear member 22 towards the right in FIG. 1 against the spring force generated by the coil spring 26 to move the ring gear member 22 towards the right. This movement of the ring gear member 22 causes a rotational displacement of the camshaft 4 through the inner cylinder 10 to enlarge the valve overlap. The maximum valve overlap is restricted by abutment between the rear end of the ring gear member 22 and the front end of the valve seat member 28. On the other hand, when the pressure control valve 34 is opened, the pressurized working fluid is released through a gap between a rear end of the oil passage 44 and the pressure control valve 34 into the oil pan so that no hydraulic pressure is applied to the pressure chamber 30. Accordingly, the ring gear member 22 is moved leftward in FIG. 1 by means of the spring force of the coil spring 26 to rotate the ring gear member 22 in an opposite direction so as to make the valve overlap smaller. The minimum valve overlap is defined by abutment between the front end of the ring gear member 22 and a corresponding stepped portion of the outer cylinder 20, where a magnitude of the valve overlap or a phase relationship of the valve timings between the intake and exhaust valves is initialized.

The control unit 36 includes a microcomputer having CPU, RAM, ROM and an input/output circuit in the known way. The control unit 36 controls the energization of the pressure control valve 34 based on various signals fed from sensors, such as a crank angle sensor 48 working as an engine speed sensor, an air flow meter 50 working as an engine load sensor and monitoring an intake air flow rate, a coolant temperature sensor 52 monitoring a temperature of an engine cooling water, an idle switch 54 associated with a throttle valve to detect an engine idling, a neutral switch 56 detecting a neutral position of a power transmission and a car speed sensor 58 monitoring an actual car speed, so as to control the valve overlap optimumly according to the monitored engine driving condition.

Figure 2:
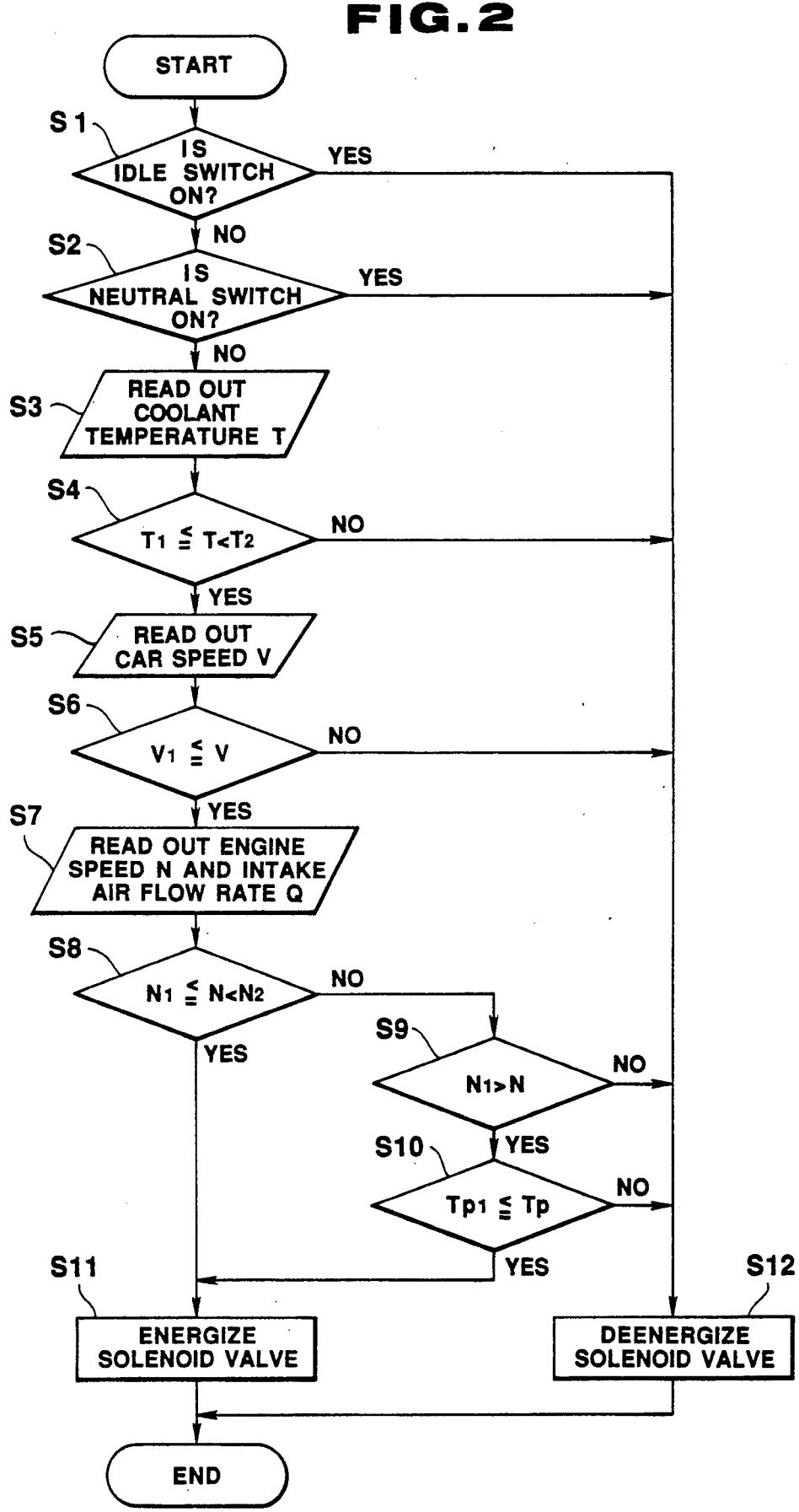
FIG. 2 is a flowchart showing a valve timing control routine to be executed by a control unit in the preferred embodiment of FIG. 1.

FIG. 2 shows a flowchart of a valve timing control routine or a valve overlap control routine to be executed by the control unit 36.

At a first step S1, it is determined whether the idle switch 54 is ON. When a decision at the step S1 is YES, then the routine goes to a step S12 where the deenergization of the pressure control valve 34 is determined, and the control unit deenergizes the pressure control valve 34 to set the valve overlap minimum. Accordingly, when the throttle valve is fully closed, the valve overlap is set minimum irrespective of the other engine operation parameters. On the other hand, when a decision at the step S1 is NO, the routine goes to a step S2.

At the step S2, it is determined whether the neutral switch 56 is ON. When a decision at the step S2 is YES, then the routine goes to the step S12 where the deenergization of the pressure control valve 34 is determined to set the valve overlap minimum since the engine is not connected to a final drive. On the other hand, when the decision at the step S2 is NO, then the routine goes to a step S3.

At the step S3, a temperature T of the engine cooling water is read out based on the signal from the coolant temperature sensor 52. Subsequently, at a step S4, it is determined whether the temperature T is within a predetermined range ($T_1 \leq T < T_2$) which represents a normal engine driving temperature range. When a decision at the step S4 is NO, then the routine goes to the step S12 where the deenergization of the fow control valve 34 is determined to set the valve overlap minimum. On the other hand, when the decision at the step S4 is YES, then the routine goes to a step S5 where a car speed V is read out based on the signal from the car speed sensor 58. Subsequently, at a step S6, it is determined whether the car speed V is no less than a predetermined value $V_1$ (for example, 8 km/h). When a decision at the step S6 is NO, then the routine goes to the step S12 where the deenergization of the flow control valve 34 is determined to set the valve overlap minimum. Accordingly, when the car speed V is less than the predetermined value, the valve overlap is made minimum irrespective of the other monitored engine operation parameters, such as the engine speed and the engine load, so that even when the accelator pedal is immediately released after the aforementioned stall starting, the failure of the engine operation due to the response delay of the ring gear member 22 is effectively prevented. On the other hand, when the decision at the step S6 is YES, then the routine goes to a step S7 where the engine speed N and the intake air flow rate Q are read out based on the signals from the crank angle sensor 48 and the air flow meter 50, respectively. Subsequently, at a step S8, it is determined whether the engine speed N is within a predetermined speed range ($N_1 \leq N < N_2$) which represents a predetermined intermediate and high engine speed range. When a decision at the step S8 is NO, then the routine goes to a step S9 where it is determined whether the engine speed N is less than the predetermined engine speed $N_1$. When a decision at the step S9 is NO, then the routine goes to the step 12 where the deenergization of the flow control valve 34 is determined to set the valve overlap minimum. Specifically, the decision NO at the step S9 means that the engine speed N is no less than the predetermined engine speed $N_2$. As mentioned in the background art, when the engine speed N is no less than the predetermined value $N_2$, the large valve overlap reduces the maximum engine torque. Accordingly, when the decision at the step S9 is NO, the deenergization of the pressure control valve 34 is determined to make the valve overlap minimum.

On the other hand, when the decision at the step S9 is YES, i.e. the engine is operating at a predetermined low speed, the routine goes to a step S10.

At the step S10, it is determined whether a basic fuel injection amount $T_p$, which is derived from the engine speed N and the air flow rate Q read out at the step S7, is no less than a predetermined value $T_{p1}$ which is stored in the control unit 36 as a reference value relative to the engine speed N. When a decision at the step S10 is NO, that is, the engine is operating under a predetermined low load range, then the routine goes to the step S12 where the deenergization of the pressure control valve 34 is determined to set the valve overlap minimum since it is considered that the engine load is small enough to require the small valve overlap. On the other hand, when the decision at the step S10 is YES, the routine goes to a step 11 where the energization of the pressure control valve 34 is determined, and the control unit energizes the pressure control valve to set the valve overlap maximum.

Referring back to the step S8, when the decision at the step S8 is YES, the routine goes to the step 11 where the energization of the flow control valve 34 is determined to set the valve overlap maximum.

As appreciated from the foregoing description, in the valve timing control system according to the preferred embodiment of the present invention, the valve overlap is always set minimum when the car speed V is less than the predetermined value $V_1$. Accordingly, the failure of the engine operation pointed out in the background art is effectively eliminated. On the other hand, when the car speed V is no less than the predetermined value $V_1$, the magnitude of the valve overlap is properly controlled depending on the monitored engine driving conditions.

It is to be appreciated that a modification is possible where the steps S1 to S4 may be executed between the steps S6 and S7. Further, the steps S7 to S12 may be replaced with other steps which can properly control the magnitude of the valve overlap depending on preselected monitored engine operation parameters when the car speed V is no less than the predetermined value $V_1$.

It is to be understood that this invention is not to be limited to the embodiments described above, and that various changes and modifications may be made without departing from the spirit and scope of the invention as defined in the appended claims.

For example, though the valve timing of the intake valve is controlled relative to that of the exhaust valve by varying the angular phase of the camshaft relative to the engine crankshaft in the foregoing preferred embodiments, it is also possible to arrange such that the valve timing of the exhaust valve is controlled relative to that of the intake valve in the same manner.

I claim:

1. A valve timing control system for an internal combustion engine of a car, said valve timing control system controlling a magnitude of a valve overlap depending on a monitored engine driving condition, said valve timing control system comprising:

a valve timing varying mechanism which is adapted to vary the magnitude of the valve overlap between a first value in which said magnitude is small and a second value in which said magnitude is large;

first means for selectively applying first and second actuation forces to said valve timing varying mechanism to cause said valve timing mechanism to vary said magnitude between said first and second values;

second means for deriving a car speed based on an output from car speed sensor means;

third means for comparing the derived car speed with a predetermined value;

fourth means, responsive to said third means, for controlling said first means to apply the first actuation force to said valve timing varying mechanism, irrespective of said monitored engine driving condition, to set said magnitude to said first value when the derived car speed is less than said predetermined value;

fifth means, responsive to said third means, for controlling said first means to apply the second actuation force to said valve timing varying mechanism, depending on said monitored engine driving condition, to set said magnitude to said second value when the derived car speed is no less than the predetermined value.

2. A valve timing control system as set forth in claim 1, wherein said fifth means controls the first means to apply the second actuation force to said valve timing varying mechanism when a monitored engine speed is between first and second predetermined values, or when the monitored engine speed is less than said first predetermined value with a monitored engine load being no less than a predetermined value.

3. A valve timing control system as set forth in claim 2, wherein the system includes sixth means for detecting a fully closed position of an engine throttle valve, and seventh means, responsive to said sixth means, for controlling said first means to apply the first actuation force to said valve timing varying mechanism to set said magnitude to said first value when the fully closed position of said throttle valve is detected by said sixth means.

4. A valve timing control system as set forth in claim 3, wherein said sixth means includes an idle.

5. A valve timing control system as set forth in claim 2, wherein the system includes eighth means for a neutral position of a power transmission, and ninth means, responsive to said eighth means, for controlling said first means to apply the first actuation force to said valve timing varying mechanism to set said magnitude to said first value when the neutral position of said power transmission is detected by said eighth means.

6. A valve timing control system as set forth in claim 2, wherein the system includes tenth means for deriving a temperature of an engine coolant based on an output from engine coolant temperature sensor means, and eleventh means, responsive to said tenth means, for controlling said first means to apply the first actuation force to said valve timing varying mechanism to set said magnitude to said first value when the derived temperature is deviated from a predetermined temperature range.

7. A valve timing control system as set forth in claim 2, wherein the system includes twelfth means for detecting a fully closed position of an engine throttle valve, thirteenth means for detecting a neutral position of a power transmission, fourteenth means for deriving a temperature of an engine coolant based on an output from engine coolant temperature sensor means and fifteenth means for comparing the derived temperature with a predetermined temperature range, and wherein said second means derives said car speed when no detection of the fully closed position of said throttle valve is determined by said twelfth means and no detection of the neutral position of said power transmission is determined by said thirteenth means and said fifteenth means determines that the derived temperature is within said predetermined temperature range.

8. A valve timing control system as set forth in claim 2, wherein said predetermined value of the monitored engine load is a fuel injection amount derived based on the monitored engine speed and a monitored air flow rate derived based on an output from air flow meter means.

9. A valve timing control system as set forth in claim 1, wherein said valve timing varying mechanism includes a first rotational member which is driven in synchronism with an engine revolution synchronous element, a second rotational member disposed in said first rotational member coaxially therewith and being associated with a rotatable camshaft for co-rotation therewith, said camshaft being adapted to actuate one of an intake valve and an exhaust valve through its rotation, and a third rotational member disposed between said first and second rotational members coaxially therewith, said first, second and third rotational members being arranged such that an axial displacement of said third rotational member causes an angular phase shift of said camshaft relative to said first rotational member to vary the magnitude of the valve overlap.

10. A valve timing control system as set forth in claim 9, wherein said first actuation force moves said third rotational member axially in a first direction to set said magnitude to said first value, and said second actuation force moves said third rotational member axially in a second direction to set said magnitude to said second value, said second direction being axially opposite to said first direction.

11. A valve timing control system as set forth in claim 10, wherein said first means includes a hydraulic circuit and a spring, said hydraulic circuit including a pressure control valve which is closed to establish a hydraulic pressure within said hydraulic circuit and is opened to release said hydraulic pressure, said hydraulic pressure being selectively exerted on said third rotational member for biasing said third rotational member in said second direction when said spring exerts its spring force on said third rotational member for biasing the latter in said first direction, said first actuation force being applied to said third rotational member when the pressure control valve is opened to release the hydraulic pressure, and said second actuation force being applied to said third rotational member when said pressure control valve is closed to establish said hydraulic pressure which overcomes the spring force of said spring.

12. A valve timing control system as set forth in claim 11, wherein said fourth means controls said pressure control valve to open for applying the first actuation force to said third rotational member when the derived car speed is less than the predetermined value, and said fifth means controls said pressure control valve to close for applying the second actuation force to said third rotational member depending on the monitored engine driving condition when the derived car speed is no less than the predetermined value.

13. A valve timing control system as set forth in claim 12, wherein said pressure control valve is a solenoid valve.

14. In a car having an internal combustion engine and a valve timing control system for the internal combustion engine;
    means for monitoring a speed of said car and for generating a car speed indicative signal indicative of said monitored car speed;
    a valve timing varying mechanism to constructed and arranged on said internal combustion engine as to vary the magnitude of a valve overlap of said internal combustion engine between a first value and a second value that i larger than said first value;
    actuator means for actuating said valve timing varying mechanism to cause said valve timing varying mechanism to vary said magnitude of said valve overlap; and
    a control unit operatively connected to said car speed monitoring means and said actuator means, said control unit including:
    means for comparing said car speed indicative signal with a predetermined value and for generating an output signal when said car speed indicative signal is less than said predetermined value; and
    means for urging said actuator means to cause said valve timing varying mechanism to set said magnitude of said valve overlap at said first value when said output signal is present.

* * * * *